United States Patent
Watanabe et al.

(10) Patent No.: US 7,592,050 B2
(45) Date of Patent: Sep. 22, 2009

(54) METHOD FOR FORMING CARBON NANOTUBE THIN FILM

(75) Inventors: Miho Watanabe, Kanagawa (JP);
Chikara Manabe, Kanagawa (JP);
Taishi Shigematsu, Kanagawa (JP);
Masaki Hirakata, Kanagawa (JP);
Shinsuke Okada, Saitama (JP); Shigeki Ooma, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 788 days.

(21) Appl. No.: 11/143,606

(22) Filed: Jun. 3, 2005

(65) Prior Publication Data
US 2006/0134326 A1 Jun. 22, 2006

(30) Foreign Application Priority Data
Dec. 22, 2004 (JP) ............... 2004-371532

(51) Int. Cl.
*B05D 1/18* (2006.01)
(52) U.S. Cl. ............... 427/430.1; 427/434.3; 977/890; 977/892
(58) Field of Classification Search ............... 427/430.1
See application file for complete search history.

(56) References Cited

U.S. PATENT DOCUMENTS 4,511,604 A * 4/1985 Barraud et al. ............. 427/402

FOREIGN PATENT DOCUMENTS

| JP | A 2000-109308 | | 4/2000 |
| JP | 2002226209 A | * | 8/2002 |
| JP | A 2002-226209 | | 8/2002 |
| JP | 2004142972 A | * | 5/2004 |
| JP | A 2004-142972 | | 5/2004 |

OTHER PUBLICATIONS

Durkop et al., "Extraordinary Mobility in Semiconducting Carbon Nanotubes," Nano Letters, vol. 4, No. 1, American Chemical Society, pp. 35-39, 2004.

* cited by examiner

*Primary Examiner*—Timothy H Meeks
*Assistant Examiner*—David Turocy
(74) *Attorney, Agent, or Firm*—Oliff & Berridge, PLC

(57) ABSTRACT

A method for producing a carbon nanotube thin film comprises a step of dropping a mixed liquid containing carbon nanotubes and an ionic liquid onto a liquid surface of a film forming liquid to spread the carbon nanotubes on the liquid surface.

14 Claims, 6 Drawing Sheets

COMPRESSING DIRECTION

NO COMPRESSION

NO COMPRESSION

METHOD FOR FORMING CARBON NANOTUBE THIN FILM

BACKGROUND OF THE INVENTION

1. Field of the Invention

The present invention relates to a method for forming a carbon nanotube thin film, which is a thin film having carbon nanotubes that are two-dimensionally spread all over the thin film.

2. Description of the Related Art

A carbon nanotube is a new material containing only carbon atoms as the constituting element discovered in 1991. A carbon nanotube has a cylindrical shape having one-dimensionality formed by winding a graphene sheet constituted by six-membered rings of carbon atoms. A carbon nanotube having a structure containing only one graphene sheet is referred to as a single wall carbon nanotube (SWNT), and a carbon nanotube having a multilayer structure is referred to as a multiwall carbon nanotube (MWNT).

An SWNT has a diameter of about 1 nm, and an MWNT has a diameter of several tens nanometers, which are extremely thinner than those materials that have been referred to as carbon fibers. A carbon nanotube has a nature that is greatly different from other materials constituted only by carbon atoms, such as graphite, amorphous carbon and diamond.

A carbon nanotube has multimodal electric characteristics including metallic nature and semiconductor nature depending on the mode of arrangement of atoms (chirality), and is excellent in mechanical strength. Therefore, a carbon nanotube is receiving attention in various fields of art.

In the field of electronics, for example, various attempts have been made to utilize the particular electric capability of a carbon nanotube in a field effect transistor. T. Durkop, et al., *NANO LETTER*, vol. 4, p. 35-39 (2004) reports performance of a field effect transistor (FET) produced by using one SWNT. According to the measurement results reported in the document, the mobility is $10^5$ cm$^2$/Vs, which outstrips a silicon transistor. However, the production process thereof has such a problem that the process includes such a step that electrodes are arranged on each of SWNT, which is a nanometer scale material, and thus it is not suitable for industrial use through mass production.

One approach for solving the problem includes a method of handling carbon nanotubes in a bulk state rather than each of carbon nanotubes. In particular, such a method is being variously investigated that carbon nanotubes, which is originally difficult to process due to the powder form thereof, are formed into a film to facilitate handling and processing thereof.

For example, JP-A-2000-109308 discloses a method for obtaining a carbon nanotube film by converting silicon carbide grown on a silicon wafer to carbon nanotubes through a heat treatment at a high temperature. However, the method requires that the substrate is heated to 1,700° C., and cannot be applied to such a substrate as plastics.

JP-A-2002-226209 discloses such a method for obtaining a carbon nanotube film by solubilizing carbon nanotubes through introduction of amide groups thereinto, and then accumulating them on a substrate through the Langmuir-Blodgett (LB) method. However, it is necessary in the method that functional groups are introduced into carbon nanotube for forming carbon nanotubes into a film. In other words, the method has such a problem that carbon nanotube having no functional group introduced cannot be formed into a thin film.

As a method for forming carbon nanotubes into a thin film without introduction of functional groups, it has been known that carbon nanotubes dispersed in a solvent are sprayed on a substrate. In this method, however, carbon nanotubes cannot be well dispersed due to aggregation thereof, and thus a uniform film cannot be formed. Therefore, such a solvent has been demanded that can well disperse carbon nanotubes for obtaining a uniform thin film.

As a solvent satisfying the demand, there has been the ionic liquid proposed in JP-A-2004-142972. JP-A-2004-142972 discloses that in the case where carbon nanotubes are mixed with the ionic liquid and segmentalized by applying a shearing force, they turn into a gelled state. However, there is no specific measure for forming a carbon nanotube thin film disclosed in the document.

SUMMARY OF THE INVENTION

Under the circumstances, the invention provides such a method for producing a carbon nanotube thin film that can easily produce a uniform carbon nanotube thin film irrespective to the presence or absence of functional groups in carbon nanotubes used. The invention also provides such a method for producing a carbon nanotube thin film that can form a carbon nanotube thin film directly on a surface of an arbitrary substrate.

In order to solve the aforementioned problems, the method for producing a carbon nanotube thin film according to the invention contains a step of dropping a mixed liquid containing carbon nanotubes and an ionic liquid onto a liquid surface of a film forming liquid to spread the carbon nanotubes on the liquid surface.

The ionic liquid herein is a salt that is in a liquid state at ordinary temperature and ordinary pressure and can be selected from materials having been well known in the art. The mixed liquid can be obtained by adding carbon nanotubes to the ionic liquid thus selected and then well mixed in a mortar or the like. The mixed liquid is dropped on a liquid surface of a film forming liquid, such as water, to spread the carbon nanotubes on the liquid surface, whereby a carbon nanotube thin film can be produced.

The film forming liquid preferably has a surface tension of $5.0 \times 10^{-2}$ N/m or more, and specific preferred examples of the liquid include water and glycerin, which may be used as a mixture.

In a preferred embodiment of the invention, the method further contains, subsequent to the dropping step, a step of compressing the carbon nanotube thin film thus spread on the liquid surface of the film forming liquid in a direction in parallel to the liquid surface. By carrying out the compressing step, such a carbon nanotube thin film can be obtained that the carbon nanotubes are oriented in a direction perpendicular to the compressing direction.

The method preferably contains, subsequent to the dropping step (subsequent to the compressing step when it is carried out), a step of drawing up the carbon nanotube thin film thus spread (spread and compressed when the compressing step is carried out) on the liquid surface of the film forming liquid. The carbon nanotube thin film produced can be easily utilized as a film by drawing up the carbon nanotube thin film thus spread (spread and compressed when the compressing step is carried out) on the liquid surface of the film forming liquid.

In the case where the carbon nanotube thin film is to be used by forming on a surface of a substrate, it is preferred that the drawing up step contains a step of withdrawing the substrate, a part or the whole of which has been immersed in advance in the film forming liquid, from the liquid surface of the film forming liquid to make the surface of the substrate, on which the carbon nanotube thin film is to be formed, into contact with the carbon nanotube thin film thus spread (spread and compressed when the compressing step is carried out) on the liquid surface of the film forming liquid.

Only by simply withdrawing the substrate having been immersed in the film forming liquid, an edge part of the carbon nanotube thin film spread (and compressed) on the liquid surface of the film forming liquid is sequentially adhered to the surface of the substrate in contact therewith, whereby the thin film can be easily transferred to the surface of the substrate.

BRIEF DESCRIPTION OF THE DRAWINGS

Preferred embodiments of the present invention will be described in detail based on the following figures, wherein.

DETAILED DESCRIPTION OF THE INVENTION

Figure 1:
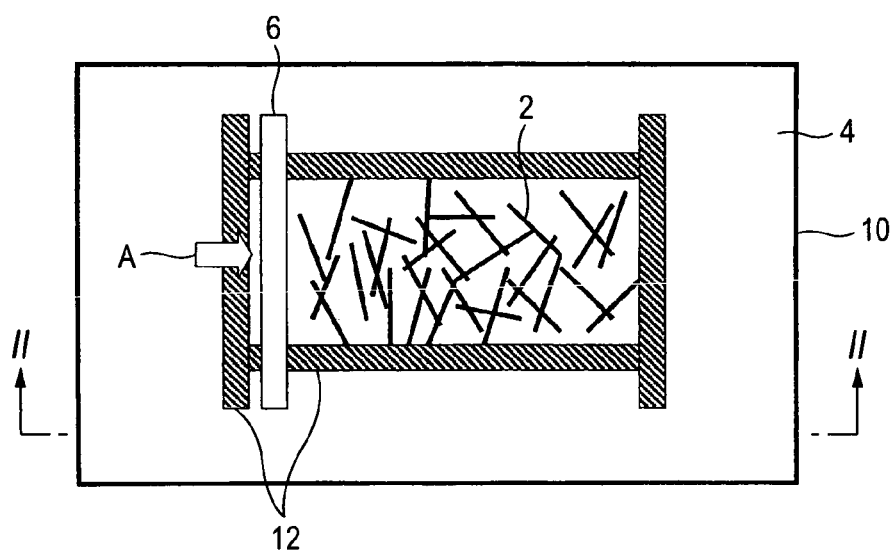
FIG. 1 is a schematic plane view showing an example of an apparatus suitable for carrying out the compressing step of the method for producing a carbon nanotube thin film of the invention.

The method for producing a carbon nanotube thin film of the invention requires (A) a dropping step of dropping a mixed liquid containing carbon nanotubes and an ionic liquid onto a liquid surface of a film forming liquid to spread the carbon nanotubes on the liquid surface, and subsequently, one or both of (B) a compressing step of compressing the carbon nanotube thin film thus spread on the liquid surface of the mixed liquid in a direction in parallel to the liquid surface and (C) a drawing up step of drawing up the carbon nanotube thin film thus spread on the liquid surface of the film forming liquid are carried out depending on necessity.

The invention will be described in detail below with reference to the respective steps.

(A) Dropping Step

The dropping step, which is necessary in the invention, is a step of dropping a mixed liquid containing carbon nanotubes and an ionic liquid onto a liquid surface of a film forming liquid to spread the carbon nanotubes on the liquid surface.

(Carbon Nanotube)

In general, a carbon nanotube is a graphene sheet constituted by six-membered rings of carbon atoms formed into a tube in parallel to the axis of the tube. Carbon nanotubes are classified into single wall carbon nanotubes, which have a structure containing only one graphene sheet, and multiwall carbon nanotubes, which have a multilayer structure containing plural graphene sheets. The kind of carbon nanotubes is determined by the synthesis method and the conditions therefor.

The carbon nanotubes used in the invention may be either single wall carbon nanotubes or multiwall carbon nanotubes having two or more graphene sheet layers. The kind of the carbon nanotubes used and whether or not they are mixed may be appropriately determined depending on the purpose of the resulting carbon nanotube thin film and the cost.

Variants of single wall carbon nanotubes may also be used in the invention, examples of which include carbon nanohorns (having a horn shape where the diameter thereof is continuously increased from one end to the other end), carbon nanocoils (having a coil form in a spiral shape in total), carbon nanobeads (having a tube at the center, which penetrates a spherical bead formed with amorphous carbon and the like), cup-stacked carbon nanotubes, and carbon nanotubes having carbon nanohorns or amorphous carbon covering the outer periphery thereof.

Metal-containing carbon nanotubes encompassing a metal or the like in carbon nanotubes, peapod carbon nanotubes encompassing fullerene or metal-containing fullerene in carbon nanotubes, and carbon nanotubes encompassing some other kinds of substances may also be used as the carbon nanotube in the invention.

As having been described, in addition to the ordinary carbon nanotubes, carbon nanotubes in various configurations, such as variants thereof and carbon nanotubes having been variously modified, can be used in the invention without any problem. Therefore, the concept "carbon nanotubes" referred in the invention includes all those materials.

The carbon nanotubes can be synthesized by the arc discharge process, a laser ablation process and the CVD process, which have been known in the art, and the invention is not limited in production process. Among these, the arc discharge process carried out in a magnetic field is preferred since carbon nanotubes having high purity can be synthesized.

The carbon nanotubes used preferably have a diameter of from 0.3 to 100 nm. In the case where the diameter of the carbon nanotubes exceeds the range, synthesis thereof is difficult to be attained, and it is not preferred from the standpoint of cost. The upper limit of the diameter of the carbon nanotubes is more preferably 30 nm.

The lower limit of the diameter of the carbon nanotubes is generally about 0.3 nm in consideration of the structure thereof. There are some cases where the yield upon synthesis is lowered when the carbon nanotube is too thin, and therefore, it is preferably 1 nm or more, and more preferably 10 nm or more.

The carbon nanotubes used preferably have a length of from 0.1 to 100 μm. In the case where the length of the carbon nanotubes exceeds the range, it is not preferred from the standpoint of cost since synthesis thereof is difficult to be attained or necessitates a special process. The upper limit of the length of the carbon nanotubes is more preferably 10 μm, and the lower limit thereof is more preferably 1 μm.

In the case where the carbon nanotubes to be used have not higher purity, it is preferred that the purity is improved by purifying before preparing a mixed liquid described later (purifying step). In the invention, the purity of the carbon nanotubes is preferably as high as possible, and specifically, the purity is preferably 90% or more, and more preferably 95% or more. The purifying method of the carbon nanotubes is not particularly limited, and the methods having been known in the art can be employed.

Carbon nanotubes having a functional group may also be used in the invention. Examples of the functional group that can be added to the carbon nanotubes include a hydrophilic functional group, such as —COOH, —NH$_2$, —OH and —CHO, and a hydrophobic functional group, such as —COOR (wherein R represents a hydrocarbon group) and —SiR$_3$ (wherein R represents a hydrocarbon group).

The method for introducing the functional group may be the methods having been known in the art, and for example, the functional group can be introduced into carbon nanotube by the method disclosed in JP-A-2002-503204.

(Ionic Liquid)

The ionic liquid in the invention means such a liquid that is referred to as an ambient temperature molten salt or simply a molten salt and constituted by an organic cation and an inorganic anion, and is in a liquid state under ordinary temperature and ordinary pressure even though it is constituted only by ions. The ionic liquid is receiving intensive attention since the discovery of such an ionic liquid in 1992 that is stable in the air and is constituted by an organic cation and an inorganic anion. The ionic liquid is excellent in heat stability and chemical stability and has such characteristics as incombustibility and non-volatility. In the invention, the ionic liquid may be selected from those having been known in the art.

Preferred examples of the ionic liquid in the invention include those constituted by a cation represented by one of the following general formulae (1) to (4) (preferably a quaternary ammonium ion) and an anion (X$^-$).

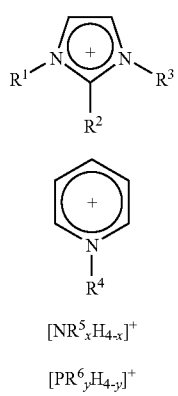

Formula (1)

Formula (2)

[NR$^5_x$H$_{4-x}$]$^+$  Formula (3)

[PR$^6_y$H$_{4-y}$]$^+$  Formula (4)

In the general formula (1), R$^1$ represents an alkyl group having from 1 to 4 carbon atoms or a hydrogen atom, and particularly preferably a methyl group having 1 carbon atom, and R represents an alkyl group having from 1 to 4 carbon atom or a hydrogen atom, and particularly preferably a hydrogen atom.

In the general formulae (1) to (4), R$^3$ to R$^6$ each represents an alkyl group having 20 or less carbon atoms or an alkyl group having an ether bond and a total number of carbon and oxygen of 20 or less.

In the general formula (1), it is preferred that R$^1$ and R$^3$ are not the same as each other.

In the general formula (3) and (4), x and y each represents an integer of from 1 to 4.

Examples of the anion (X$^-$) as a counter ion of the cation include ions of tetrafluoroboric acid, hexafluorophosphoric acid, bi(trifluoromethylsulfonyl)imidic acid, perchloric acid, tris(trifluoromethylsulfonyl)carbon acid, trifluoromethanesulfonic acid, dicyanamide, trifluoroacetic acid, an organic carboxylic acid and a halogen.

In the invention, a commercially available ionic liquid, such as an ionic acid available from Kanto Kagaku Corp., can be used without problems.

The ionic liquid is appropriately selected depending on the kind of the carbon nanotubes. For example, in the case where the carbon nanotubes used have a hydrophilic functional group, such as —COOH, —NH$_2$, —OH and —CHO, a hydrophilic ionic liquid is preferably combined therewith. In the case where the carbon nanotubes used have no functional group, and the case where the carbon nanotubes used have a hydrophobic functional group, such as —COOR (wherein R represents a hydrocarbon group) and —SiR$_3$ (wherein R represents a hydrocarbon group), on the other hand, a hydrophobic ionic liquid is preferably combined therewith.

(Preparation of Mixed Liquid of Ionic Liquid and Carbon Nanotubes)

The carbon nanotubes and the ionic liquid are mixed to prepare a mixed liquid of an ionic liquid and carbon nanotubes (hereinafter, sometimes simply referred to as a mixed liquid) used in for producing a carbon nanotube thin film (mixing step).

It is preferred to apply a shearing force upon mixing. In this operation, it has been reported in JP-A-2004-142972 that the ionic liquid is coordinated among each of the carbon nanotubes to bond the carbon nanotubes with a cation-π-electron interaction. Accordingly, in the case where an ionic liquid is used as a dispersion medium as in the invention, each of the carbon nanotubes in the mixed liquid cannot be present completely independently from each other, but bundles of carbon nanotubes are present. The bundles are liable to form in the case where the carbon nanotubes are SWNT and in the case where the carbon nanotubes are MWNT but are thin and flexible.

Specifically, the ionic liquid and the carbon nanotubes are placed in a mortar and well mixed under application of a shearing force by a pestle. A mixed liquid having carbon nanotubes well dispersed in an ionic liquid can be obtained by mixing for about 15 minutes.

The preparation method of the mixed liquid in the invention is not particularly limited, and any method can be employed that can mix and disperse the ionic liquid and the carbon nanotubes to obtain such a state that the carbon nanotubes are well dispersed in the ionic liquid.

The specific proportion of the carbon nanotubes in the mixed liquid cannot be determined unconditionally, and is generally about from 0.001 to 5 g/g, preferably from 0.005 to 1 g/g, and more preferably about from 0.01 to 0.05 g/g, based on the mass of the ionic liquid.

(Dropping and Spreading)

The mixed liquid of the ionic liquid and the carbon nanotubes thus obtained is dropped on a liquid surface of a film forming liquid to spread the carbon nanotubes on the liquid surface, whereby a carbon nanotube thin film is formed on the liquid surface.

The film forming liquid (sometimes referred to as a spread liquid or a spread solution) that can be used in the invention is preferably a liquid having a relatively large surface tension, specifically the surface tension is preferably $5.0 \times 10^{-2}$ N/m or more, and more preferably $6.0 \times 10^{-2}$ N/m or more. The film forming liquid is preferably water and/or glycerin.

The dropping amount of the mixed liquid on the liquid surface of the film forming liquid is not particularly limited and can be appropriately adjusted corresponding to such factors as the concentration of the carbon nanotubes in the mixed liquid, the kind of the carbon nanotubes used (such as the kind of carbon nanotubes, i.e., SWNT or MWNT, and the presence or absence and the kind of the functional group), the diameter and the length of the carbon nanotubes, and the purity of the carbon nanotubes. The appropriate dropping amount varies depending on the presence or absence of the subsequent compressing step, and therefore, the dropping amount is preferably determined in consideration of the subsequent steps. There is no theoretically absolute dropping amount of the carbon nanotubes because what is to be produced herein is not a monomolecular film (a monomolecular film of carbon nanotubes is practically difficult to produce).

The method of dropping the mixed liquid on the liquid surface of the film forming liquid is not particularly limited, and it is preferred that the mixed liquid is carefully dropped by using, for example, a pipette or a burette to spread the carbon nanotubes contained in the mixed liquid favorably on the liquid surface.

A carbon nanotube thin film can be easily produced on the liquid surface of the film forming liquid only by the operation of the dropping step.

(B) Compressing Step

In the case where a compressing step is carried out subsequent to the dropping step, a carbon nanotube thin film (oriented film) having carbon nanotubes arranged in one direction (oriented) can be obtained. The compressing step in the invention is such a step that the carbon nanotube thin film formed on the liquid surface of the film forming liquid is compressed in a direction in parallel to the liquid surface.

Figure 2:
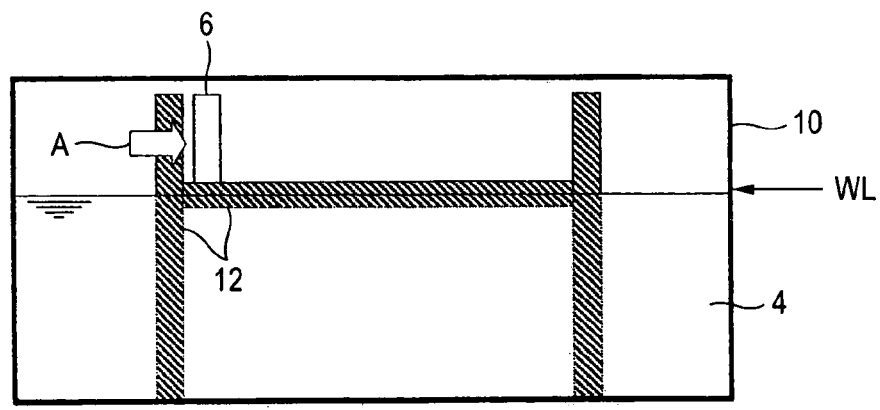
FIG. 2 is a cross sectional view on line II-II in FIG. 1.

FIG. 1 is a schematic plane view showing an example of an apparatus suitable for carrying out the compressing step, and FIG. 2 is a cross sectional view on line II-II in FIG. 1.

In FIGS. 1 and 2, numeral 10 denotes a water bath, in which a film forming liquid 4 is filled to the height of a liquid surface WL. A frame 12 is assembled to compart the liquid surface WL, inside which a float 6 having substantially the same length as the length of one edge of the frame 12 on the liquid surface WL floated on the liquid surface WL. It seems in FIG. 1 that the float 6 is protruded from the frame 12. However, the float 6 has a T-shape as viewed from the arrow A in FIG. 1, and thus the float 6 is fitted inside the frame 12 at the liquid surface WL. The float 6 may not necessarily be floated on the liquid surface WL, but it is sufficient that the float 6 is at least present at the liquid surface, and for example, the lower end thereof may be immersed in the film forming liquid 4.

In the apparatus shown in FIGS. 1 and 2, the mixed liquid of the ionic liquid and the carbon nanotubes is dropped on the wide area of the liquid surface WL thus comparted and surrounded by the frame 12 and the float 6 to spread thereon. FIGS. 1 and 2 show the state where the mixed liquid of the ionic liquid and the carbon nanotubes have been dropped and spread, in which numeral 2 schematically denotes the dispersed state of the carbon nanotubes in the mixed liquid of the ionic liquid and the carbon nanotubes.

The thin film of the carbon nanotubes 2 thus spread on the liquid surface WL of the film forming liquid 4 is then compressed by moving the float 6 to the direction shown in the arrow A (the direction in parallel to the liquid surface) as similar to the ordinary Langmuir-Blodgett method. According to the operation, the carbon nanotubes are arranged substantially in the direction perpendicular to the compressing direction (direction shown by the arrow A).

Figure 3:
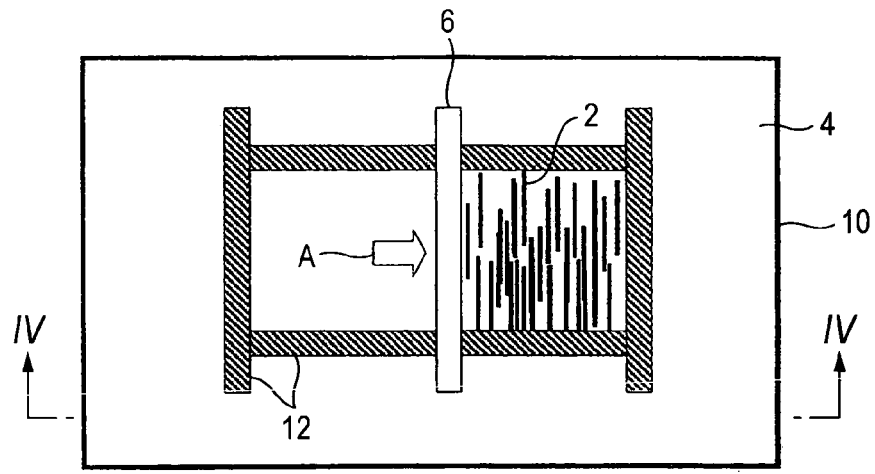
FIG. 3 is a schematic plane view showing the apparatus shown in FIGS. 1 and 2, in which the operation of the compressing step is completed.
Figure 4:
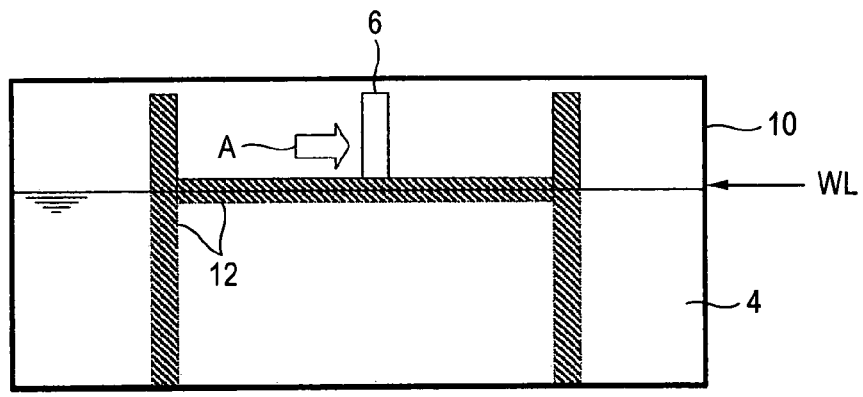
FIG. 4 is a cross sectional view on line IV-IV in FIG. 3.

FIG. 3 is a schematic plane view showing the apparatus shown in FIGS. 1 and 2, in which the operation of the compressing step is completed, and FIG. 4 is a cross sectional view on line IV-IV in FIG. 3. The same members and arrow as in FIGS. 1 and 2 are attached with the same numerals and symbols. It is understood that the carbon nanotubes 2 extending in random directions on the liquid surface WL of the film forming liquid 4 as shown in FIG. 1 are arranged in the prescribed direction as shown in FIG. 3 as a result of the operation of the compressing step.

The operation of the compressing step also has such an effect in addition to the orientation of the carbon nanotubes that the gaps among the carbon nanotubes can be reduced. A dense carbon nanotube thin film can be obtained by reducing the gaps among the carbon nanotubes.

The compressing ratio in the compressing step (i.e., the ratio $S_1/S_2$, wherein $S_1$ represents an initial area of the liquid surface of the film forming liquid, on which the mixed liquid is to be dropped and spread, and $S_2$ represents an area of the liquid surface after the compressing step) cannot be determined unconditionally because it depends on such factors as the dropped amount of the mixed liquid, the concentration of the carbon nanotubes in the mixed liquid, the kind of the carbon nanotubes used (such as the kind of carbon nanotubes, i.e., SWNT or MWNT, and the presence or absence and the kind of the functional group), the diameter and the length of the carbon nanotubes, and the purity of the carbon nanotubes.

In the case where the compressing ratio is too small, the effects obtained by the compressing step (orientation and densification of the carbon nanotubes) substantially cannot be exerted. In the case where the compressing ratio is too large, on the other hand, there are cases where the layer of the carbon nanotubes is distorted or multiplexed to impair the smoothness of the film. In the later case, however, there is such a possibility that the carbon nanotube thin film can be thickened to develop new applications.

(C) Drawing up Step

In the state where the dropping step or the compressing step is completed, the carbon nanotube thin film is present on the liquid surface of the film forming liquid. It is necessary to collect the carbon nanotube thin film for using the same.

The method for collecting the film may be any measure, for example, the film forming liquid is evaporated, and a target material, such as a substrate, to which the film is to be transferred, is made directly in contact with the liquid surface, and it is preferred that the film is collected by the drawing up step.

In the invention, the drawing up step is an operation effected after completing the dropping step or the compressing step, and is to draw up the carbon nanotube thin film thus spread on the liquid surface of the film forming liquid.

Specifically, the operation of the drawing up step may be effected by simply scooping up the carbon nanotubes on the liquid surface, but in a simpler manner, it is preferred that a part or the whole of a substrate is immersed in the film forming liquid in advance, and then the substrate is withdrawn from the liquid surface of the film forming liquid to make the surface of the substrate, on which the carbon nanotube thin film is to be formed, into contact with the carbon nanotube thin film spread on the liquid surface of the film forming liquid.

Figure 5:
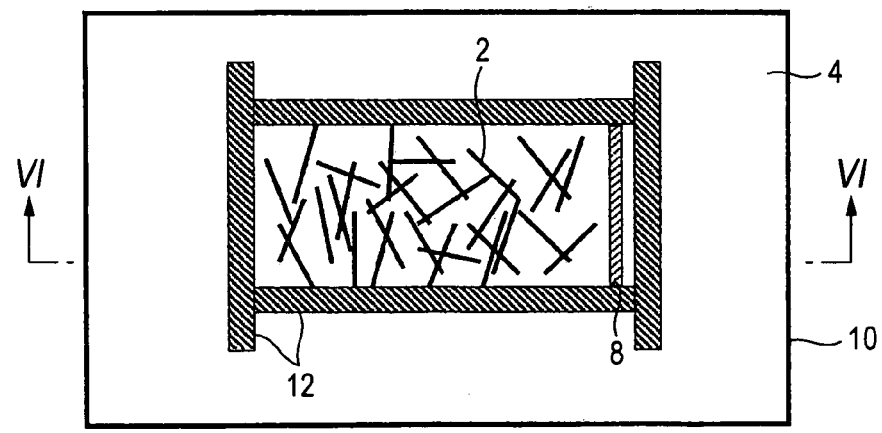
FIG. 5 is a schematic plane view showing the apparatus shown in FIGS. 1 and 2, in which a part of a substrate is immersed in a film forming liquid in advance, to which a mixed liquid of an ionic liquid and carbon nanotubes is dropped and spread.
Figure 6:
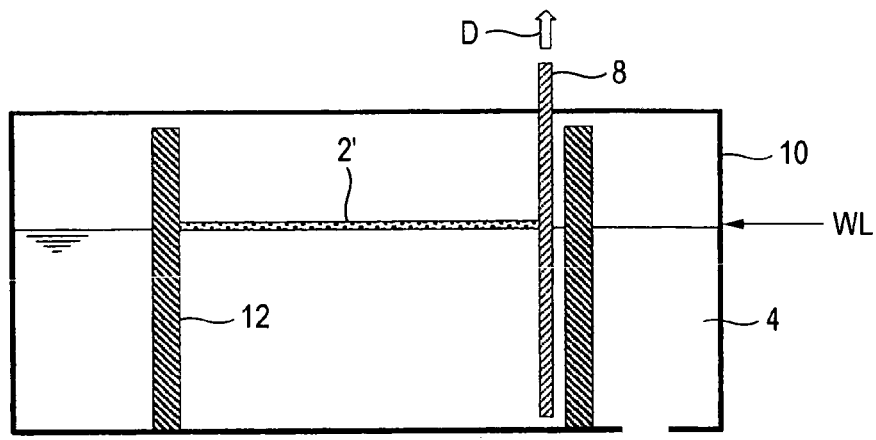
FIG. 6 is a cross sectional view on line VI-VI in FIG. 5.

FIG. 5 is a schematic plane view showing the apparatus shown in FIGS. 1 and 2, in which a part of a substrate 8 is immersed in the film forming liquid 4 in advance, to which the mixed liquid of the ionic liquid and the carbon nanotubes is dropped and spread. The same members and arrow as in FIGS. 1 and 2 are attached with the same numerals and symbols. As similar to FIGS. 1 and 3, numeral 2 schematically denotes the dispersed state of the carbon nanotubes in the mixed liquid of the ionic liquid and the carbon nanotubes in FIG. 5. FIG. 6 is a cross sectional view on line VI-VI in FIG. 5 provided that numeral 2' denotes the carbon nanotube thin film spread on the liquid surface WL of the film forming liquid 4.

Figure 7:
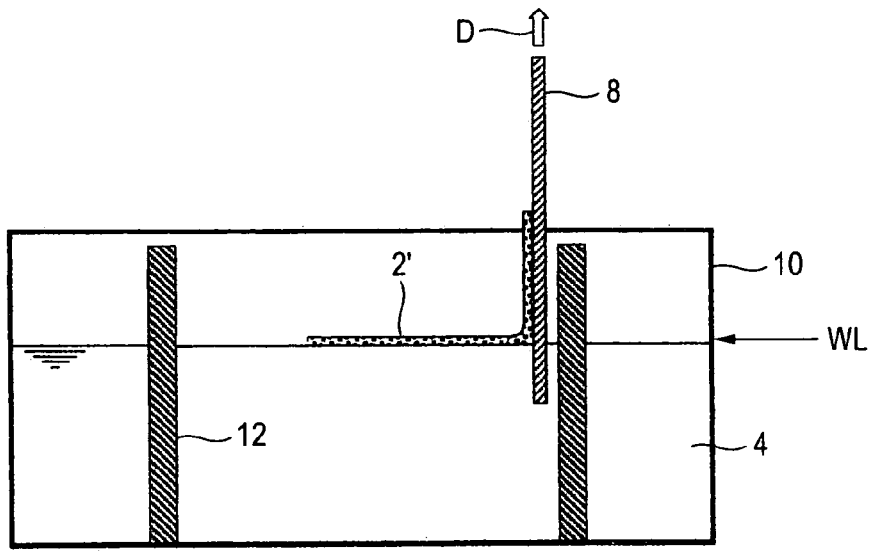
FIG. 7 is a schematic cross sectional view showing the state where the substrate is being withdrawn from the state shown in FIG. 6.

Upon drawing the substrate 8 in the vertical direction (shown by the arrow D) in the state shown in FIG. 6, an edge part of the carbon nanotube thin film 2' is sequentially adhered to the surface of the substrate 8 in contact therewith, whereby the carbon nanotube thin film 2' is transferred to the surface of the substrate 8, as shown in FIG. 7. FIG. 7 is a schematic cross sectional view showing the state where the substrate is being withdrawn from the state shown in FIG. 6.

In the above-described embodiment, the carbon nanotube thin film 2' is formed on one surface of the substrate 8, and it is also possible that the whole of the substrate 8 is completely immersed in the film forming liquid 4 in advance, and then the substrate 8 is withdrawn from the substantial center of the carbon nanotube thin film 2' spread on the liquid surface WL, whereby the carbon nanotube thin films 2' can be formed on both surfaces of the substrate 8. According to the operation, a carbon nanotube thin film can be easily formed on a desired surface of a substrate.

In the case where the operation of the compressing step is effected before the drawing up step, a carbon nanotube thin film having carbon nanotubes arranged in parallel to each other can be easily formed on a desired surface of a substrate.

Figure 8:
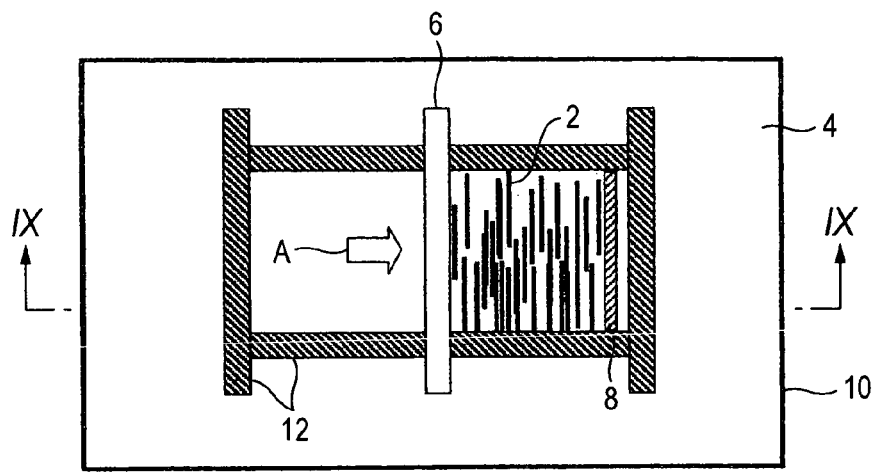
FIG. 8 is a schematic plane view showing a state after a part of a substrate is immersed in a film forming liquid in advance, and then the dropping step and the compressing step are carried out.

FIG. 8 is a schematic plane view showing a state after apart of the substrate 8 is immersed in the film forming liquid 4 in advance, and then the dropping step and the compressing step are carried out (the same state as in FIG. 3). The same members and arrow as in FIGS. 1 to 6 are attached with the same numerals and symbols. As similar to FIGS. 1, 3 and 5, numeral 2 schematically denotes the dispersed state of the carbon nanotubes in the mixed liquid of the ionic liquid and the carbon nanotubes in FIG. 8.

Figure 9:
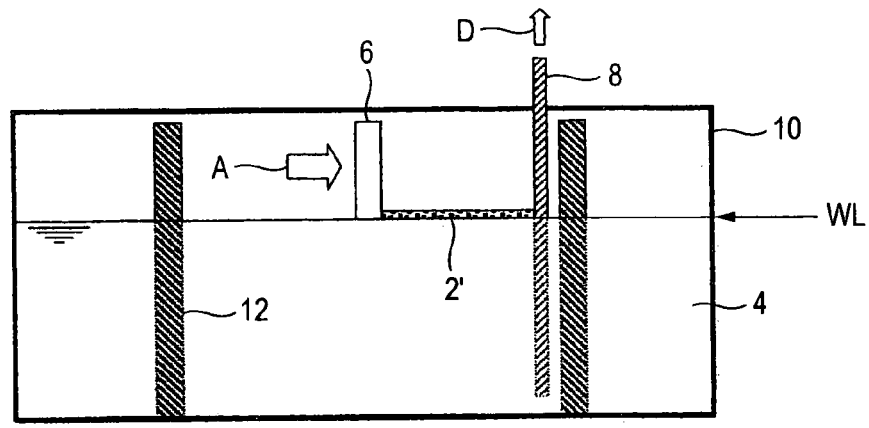
FIG. 9 is a cross sectional view on line IX-IX in FIG. 8.

FIG. 9 is a cross sectional view on line IX-IX in FIG. 8 provided that numeral 2' denotes the carbon nanotube thin film spread on the liquid surface WL of the film forming liquid 4.

Upon drawing the substrate 8 in the vertical direction (shown by the arrow D) in the state shown in FIG. 9, the carbon nanotube thin film 2' is transferred to the surface of the substrate 8 and easily formed thereon.

While the direction of withdrawing the substrate is the vertical direction as in FIGS. 6 and 7, it is not necessarily the vertical direction, and it is sufficient that the substrate is withdrawn in such a manner that the surface of the substrate is sequentially exposed from the liquid surface, whereby the carbon nanotube thin film spread (or compressed) on the liquid surface is sequentially transferred on the surface of the substrate.

The carbon nanotube thin film thus transferred on the surface of the substrate may be allowed to stand as it is (i.e., so-called air drying), whereby the film forming liquid is evaporated to form a stable layer, and depending on necessity, the thin film may be dried by hot air drying or oven drying.

The substrate used herein is not particularly limited, and examples thereof include glass, quartz, an Si wafer and a polymer film, which may be appropriately selected depending on purposes.

The carbon nanotube thin film obtained by the invention is extremely smooth and uniform. Such a smooth and uniform carbon nanotube thin film can be obtained by the invention that cannot be attained, for example, by a coated film obtained by coating a surface of a substrate with a simple carbon nanotube dispersion liquid having carbon nanotubes dispersed in a dispersion medium, such as water. According to the invention, furthermore, a carbon nanotube thin film having carbon nanotubes oriented can be easily obtained by adding the compressing step.

Carbon nanotubes as a raw material generally contain impurities, such as amorphous carbon, which cannot be completely removed even though a purification operation is effected. According to the operation of the compressing step, carbon nanotubes can be proximate to each other up to the limit, but there are cases where the carbon nanotubes cannot be compressed beyond a certain extent even though the compressing ratio is increased, due to inhibition of particles of the impurities present therein. The disincentives of capability exhibition of the carbon nanotube thin film in various purposes reside in the size of the particles of impurities rather than the content thereof.

Therefore, the diameter of the particles of impurities is preferably as small as possible, and specifically it is preferably 500 μm or less, and more preferably 100 μm or less.

As having been described, in the mixed liquid before dropping and spreading, there are cases where the plural carbon nanotubes are bundled to have a certain thickness, and in the case where a carbon nanotube thin film is formed by the production method of the invention using the mixed liquid in such a state, the resulting carbon nanotube thin film contains carbon nanotubes in such a state that they are bundled with each other.

An ionic liquid has good affinity with the film forming liquid, such as water, and even in the case where a hydrophobic ionic liquid is used in the mixed liquid, the ionic liquid gradually or rapidly runs into the film forming liquid from the mixed liquid upon dropping the mixed liquid in the dropping step, whereby carbon nanotubes mainly remain on the liquid surface. However, in the case where the carbon nanotubes are allowed to stand on the liquid surface for a too long period of time, the carbon nanotubes are transferred into the film forming liquid by dragging by the ionic liquid. Therefore, the carbon nanotube thin film is preferably drawn up at an appropriate timing by continuously probing the state of the thin film.

EXAMPLE

The invention will be described in more detail with reference to the following examples, but the invention is not construed as being limited thereto.

Example 1

(SWNT with Hydrophobic Ionic Liquid; Compressed)

(i) Purifying Step

Single wall carbon nanotube powder (purity: 40%, produced by Sigma-Aldrich, Inc.) is sieved through a mesh (pore size: 125 μm) to remove coarse aggregated bodies, and 30 mg of the carbon nanotube powder thus obtained (number average particle diameter: 1.5 nm, number average length: 2 μm) is heated in a muffle furnace at 450° C. for 15 minutes to remove carbonaceous substances other than carbon nanotubes. 15 mg of the resulting powder remaining in the furnace was immersed in 10 mL of 5N hydrochloric acid (obtained by diluting concentrated hydrochloric acid (a 35% by mass aqueous solution, produced by Kanto Kagaku Corp.) twice with pure water) for 4 hours to dissolve catalyst metals.

The mixture of the carbon nanotubes and hydrochloric acid is filtered to recover the carbon nanotubes as precipitate. The precipitate thus recovered is further purified by subjecting to the aforementioned operation including heating and immersion three times, on which the heating conditions are intensified stepwise to 450° C. for 15 minutes, 450° C. for 20 minutes, 450° C. for 30 minutes, and 550° C. for 60 minutes.

It is confirmed that the carbon nanotubes thus purified are largely improved in purity as compared to those before purification (raw material) (specifically, the purity is estimated as being 90% or more). The mass of the purified carbon nanotubes finally obtained is about 5% (1 to 2 mg) of the raw material.

The aforementioned purifying process is repeated in plural times by using fresh raw materials (single wall carbon nanotube powder) to obtain 15 mg or more of carbon nanotube powder having a high purity.

(ii) Mixing Step 10 mg of the single wall carbon nanotube powder obtained in the purifying step is weighed and added to 1 g of 1-butyl-3-methylimidazolium hexafluorophosphate as a hydrophobic ionic liquid (produced by Kanto Kagaku Corp.), followed by mixing in a mortar for 15 minutes.

(iii) Film Forming Step

1 μL of the mixed liquid obtained in the mixing step is dropped and spread on a water surface (area: 125 $cm^2$) comparted with a frame and a float (dropping step).

Thereafter, the carbon nanotubes thus spread on the water surface are compressed with the float from a width of 25 cm to 3cm (compressing ratio: 25/3=8.3) as similar to the ordinary Langmuir-Blodgett method (compressing step).

A glass substrate, which has been immersed in advance, is withdrawn in a direction perpendicular to the water surface to transfer the carbon nanotube thin film to the glass substrate (drawing up step). The carbon nanotube thin film is air-dried by allowing to stand as it is to form the carbon nanotube thin film on the surface of the glass substrate.

Figure 10:
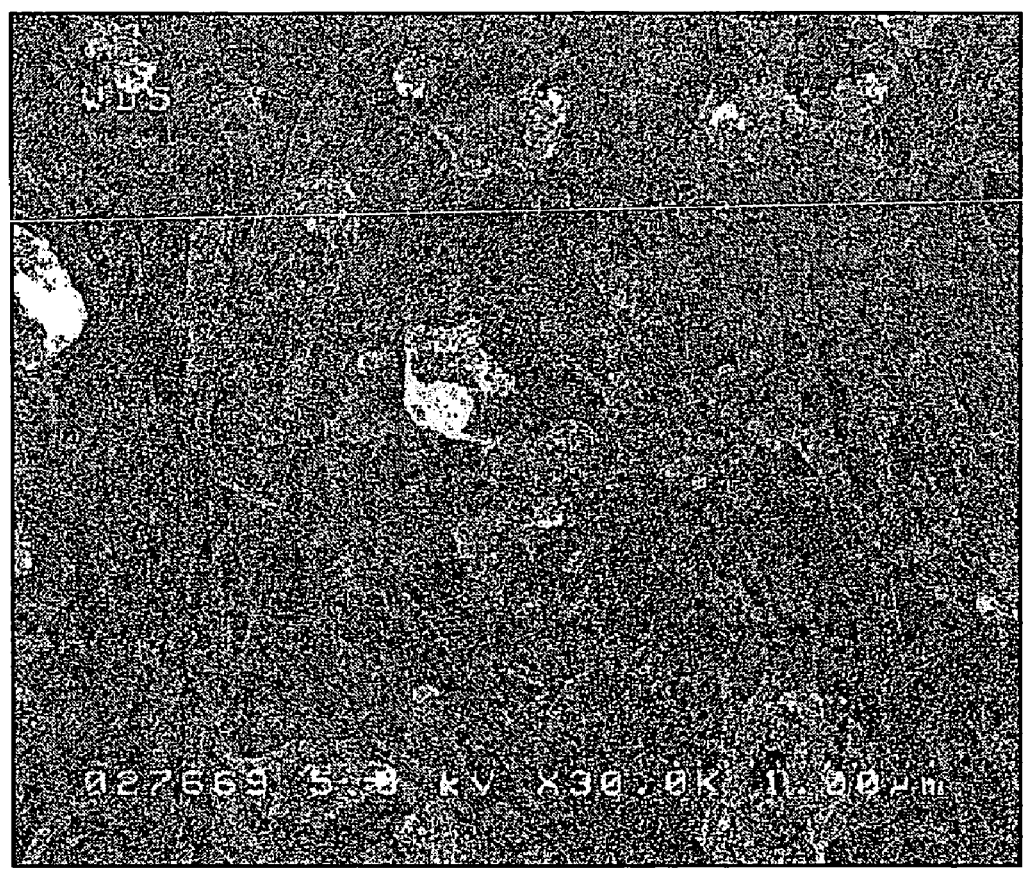
FIG. 10 is a scanning electron micrograph (magnification: 30,000) of a carbon nanotube thin film (with a compressing step) produced with SWNT in Example 1.

The carbon nanotube thin film thus obtained on the surface of the glass substrate is observed with a scanning electron microscope (magnification: 30,000), and it is confirmed that the carbon nanotube thin film is formed all over the substrate as shown in FIG. 10. It is also confirmed that the carbon nanotubes are arranged in a direction perpendicular to the compressing direction, and bundles of the carbon nanotubes are formed.

The scanning electron microscope used for observation is a scanning electron microscope Model S-4500, produced by Hitachi, Ltd. In the micrograph shown in the figure includes a slight margin of error in magnification due to an extent of enlargement of photograph (which is the same in the other electron micrographs).

Finally, the thickness of the carbon nanotube thin film is measured by scanning an edge thereof with a stylus surface roughness meter, and it is confirmed that the carbon nanotube thin film has a uniform thickness of about 100 nm.

Example 2

(SWNT having Carboxyl Groups with Hydrophilic Ionic Liquid; Compressed)

(i) Addition of Carboxyl Groups (Synthesis of Carbon Nanotube Carboxylic Acid)

Single wall carbon nanotube powder (purity: 40% or more, produced by Sigma-Aldrich, Inc.) is purified in the same purifying step as in Example 1 to obtain 30 mg or more of single wall carbon nanotube powder having a high purity (specifically, the purity is estimated as being 90% or more).

30 mg of the single wall carbon nanotube powder thus obtained is weighed and added to 20 mL of concentrated nitric acid (a 60% by mass aqueous solution, produced by Kanto Kagaku Corp.), followed by being refluxed at 120° C. for 5 hours, so as to synthesize carbon nanotube carboxylic acid.

After cooling the reaction mixture to room temperature, the mixture is subjected to centrifugal separation at 5,000 rpm for 15 minutes to separate a precipitate from a supernatant. The precipitate thus recovered is dispersed in 10 mL of pure water and then subjected to centrifugal separation at 5,000 rpm for 15 minutes to separate a precipitate from a supernatant. The washing operation including dispersion in pure water and centrifugal separation is repeated further 5 times, and finally the carbon nanotube carboxylic acid is recovered as a precipitate.

(ii) Mixing Step 10 mg of the carbon nanotube powder carboxylic acid obtained in the aforementioned step is weighed and added to 1 g of 1-butyl-3-methylimidazolium tetrafluoroborate as a hydrophilic ionic liquid (produced by Kanto Kagaku Corp.), followed by mixing in a mortar for 15 minutes.

(iii) Film Forming Step

1 μL of the mixed liquid obtained in the mixing step is dropped and spread on a water surface (area: 125 $cm^2$) comparted with a frame and a float (dropping step).

Thereafter, the carbon nanotubes thus spread on the water surface are compressed with the float from a width of 25 cm to 3cm (compressing ratio: 25/3=8.3) as similar to the ordinary Langmuir-Blodgett method (compressing step).

A glass substrate, which has been immersed in advance, is withdrawn in a direction perpendicular to the water surface to transfer the carbon nanotube thin film to the glass substrate (drawing up step). The carbon nanotube thin film is air-dried by allowing to stand as it is to form the carbon nanotube thin film on the surface of the glass substrate.

The carbon nanotube thin film thus obtained on the surface of the glass substrate is observed with a scanning electron microscope and measured for the thickness with the surface roughness meter as in the same manner as in Example 1. It is confirmed as a result that a uniform carbon nanotube thin film having a thickness of about 100 nm is formed all over the substrate as similar to Example 1.

Example 3

(MWNT with Hydrophobic Ionic Liquid; Not-compressed)

(i) Mixing Step 10 mg of multiwall carbon nanotube powder (purity: 95%, produced by Sigma-Aldrich, Inc.) is added to 1 g of 1-butyl-3-methylimidazolium hexafluorophosphate as a hydrophobic ionic liquid (produced by Kanto Kagaku Corp.), followed by mixing in a mortar for 15 minutes.

(ii) Film Forming Step

1 µL of the mixed liquid obtained in the mixing step is dropped and spread on a water surface (area: 125 cm$^2$) comparted with a frame and a float (dropping step).

A glass substrate, which has been immersed in advance, is withdrawn in a direction perpendicular to the water surface to transfer the carbon nanotube thin film to the glass substrate (drawing up step). The carbon nanotube thin film is air-dried by allowing to stand as it is to form the carbon nanotube thin film on the surface of the glass substrate.

Figure 11:
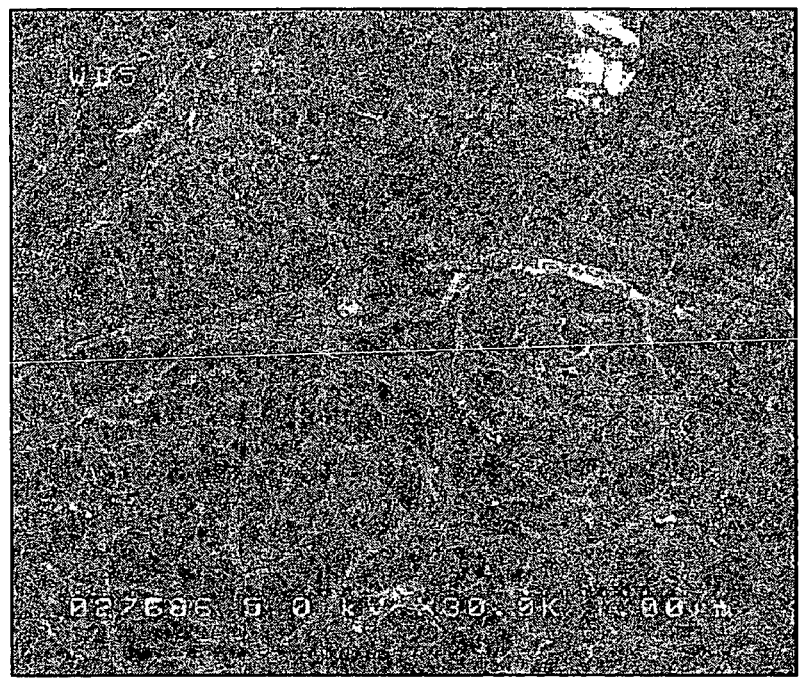
FIG. 11 is a scanning electron micrograph (magnification: 30,000) of a carbon nanotube thin film (without a compressing step) produced with MWNT in Example 3.

The carbon nanotube thin film thus obtained on the surface of the glass substrate is observed with a scanning electron microscope as in the same manner as in Example 1. It is confirmed as a result that a carbon nanotube thin film is formed all over the substrate as shown in FIG. 11.

Example 4

(SWNT with Hydrophobic Ionic Liquid; Not-compressed)

(i) Mixing Step 10 mg of the single wall carbon nanotube powder purified in the purifying step in Example 1 is added to 1 g of 1-butyl-3-methylimidazolium hexafluorophosphate as a hydrophobic ionic liquid (produced by Kanto Kagaku Corp.), followed by mixing in a mortar for 15 minutes.

(ii) Film Forming Step

1 µL of the mixed liquid obtained in the mixing step is dropped and spread on a water surface (area: 125 cm$^2$) comparted with a frame and a float (dropping step).

A glass substrate, which has been immersed in advance, is withdrawn in a direction perpendicular to the water surface to transfer the carbon nanotube thin film to the glass substrate (drawing up step). The carbon nanotube thin film is air-dried by allowing to stand as it is to form the carbon nanotube thin film on the surface of the glass substrate.

Figure 12:
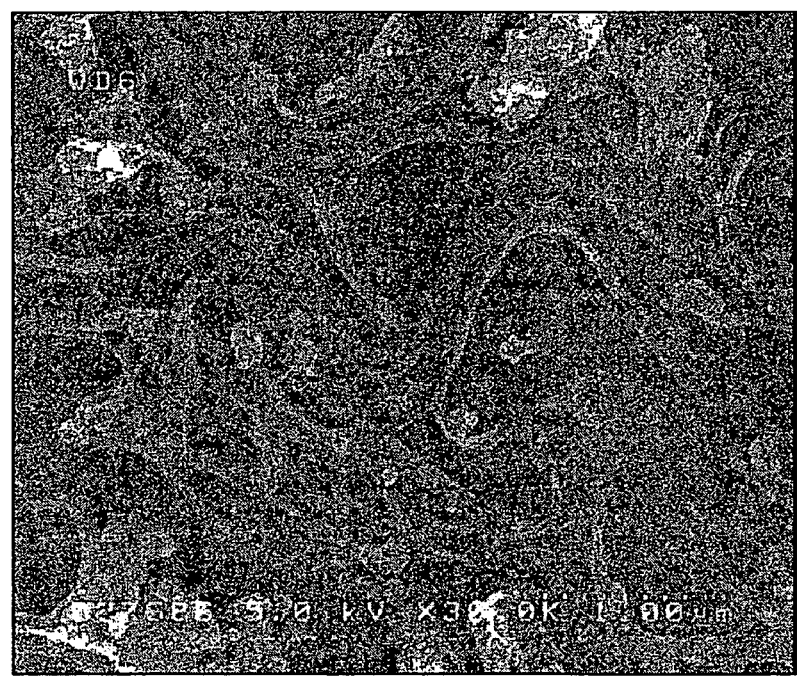
FIG. 12 is a scanning electron micrograph (magnification: 30,000) of a carbon nanotube thin film (without a compressing step) produced with SWNT in Example 4.

The carbon nanotube thin film thus obtained on the surface of the glass substrate is observed with a scanning electron microscope as in the same manner as in Example 1. It is confirmed as a result that a carbon nanotube thin film is formed all over the substrate as shown in FIG. 12.

Reference Example 1

A mixed liquid of carbon nanotubes and an ionic liquid is obtained in the same manner as in Example 1. 1 µL of the mixed liquid is dropped on liquid surfaces of ethanol, acetone and hexane, respectively. However, the carbon nanotubes are not spread on the liquid surfaces, and no thin film can be obtained in all the cases.

According to the method for producing a carbon nanotube thin film of the invention, a uniform carbon nanotube thin film can be produced irrespective to the presence or absence of functional groups in carbon nanotubes used. Furthermore, according to the method for producing a carbon nanotube thin film of the invention, a carbon nanotube thin film can be formed directly on a surface of an arbitrary substrate.

The entire disclosure of Japanese Patent Application No. 2004-371532 filed on Dec. 22, 2004 including specification, claims, drawings and abstract is incorporated herein by reference in its entirely.

What is claimed is:

1. A method for producing a carbon nanotube thin film comprising:
   a step of dropping a mixed liquid containing carbon nanotubes and an ionic liquid onto a liquid surface of a film forming liquid to spread the carbon nanotubes on the liquid surface;
   wherein the carbon nanotubes are dispersed in the ionic liquid, and
   the carbon nanotubes have a functional group selected from the group consisting of: —COOH, —OH, —CHO, —COOR and —SiR$_3$ wherein R represents a hydrocarbon group.

2. The method for producing a carbon nanotube thin film as claimed in claim 1, wherein the film forming liquid has a surface tension of 5.0×10$^{-2}$ N/m or more.

3. The method for producing a carbon nanotube thin film as claimed in claim 1, wherein the film forming liquid is at least one of water and glycerin.

4. The method for producing a carbon nanotube thin film as claimed in claim 1, further comprising, subsequent to the dropping step, a step of compressing the carbon nanotube thin film spread on a liquid surface of the film forming liquid in a direction in parallel to the liquid surface.

5. The method for producing a carbon nanotube thin film as claimed in claim 1, further comprising, subsequent to the dropping step, a step of drawing up the carbon nanotube thin film spread on the liquid surface of the film forming liquid.

6. The method for producing a carbon nanotube thin film as claimed in claim 4, further comprising, subsequent to the compressing step, a step of drawing up the carbon nanotube thin film spread and compressed on the liquid surface of the film forming liquid.

7. The method for producing a carbon nanotube thin film as claimed in claim 5, wherein the drawing up step comprises a step of withdrawing a substrate, a part or the whole of which has been immersed in advance in the film forming liquid, from the liquid surface of the film forming liquid to place a surface of the substrate, on which the carbon nanotube thin film is to be formed, into contact with the carbon nanotube thin film spread on the liquid surface of the film forming liquid.

8. The method for producing a carbon nanotube thin film as claimed in claim 6, wherein the drawing up step comprises a step of withdrawing a substrate, a part or the whole of which has been immersed in advance in the film forming liquid, from the liquid surface of the film forming liquid to place a surface of the substrate, on which the carbon nanotube thin film is to be formed, into contact with the carbon nanotube thin film spread and compressed on the liquid surface of the film forming liquid.

9. The method for producing a carbon nanotube thin film as claimed in claim 1, wherein the carbon nanotubes in the carbon nanotube thin film contain carbon nanotubes bundled with each other.

10. The method for producing a carbon nanotube thin film as claimed in claim 1, wherein a proportion of the carbon nanotubes in the mixed liquid is about from 0.001 to 5 g/g based on the mass of the ionic liquid.

11. The method for producing a carbon nanotube thin film as claimed in claim 1, wherein the proportion of the carbon nanotubes in the mixed liquid is about from 0.005 to 1 g/g based on the mass of the ionic liquid.

12. The method for producing a carbon nanotube thin film as claimed in claim 1, wherein the proportion of the carbon nanotubes in the mixed liquid is about from 0.01 to 0.05 g/g based on the mass of the ionic liquid.

13. The method for producing a carbon nanotube thin film as claimed in claim 1, wherein under the condition that the functional group of the carbon nanotubes is selected from the group consisting of COOH, OH and CHO, the ionic liquid is a hydrophilic ionic liquid.

14. The method for producing a carbon nanotube thin film as claimed in claim 1, wherein under the condition that the functional group of the carbon nanotubes is selected from the group consisting of COOR and $SiR_3$, the ionic liquid is a hydrophobic ionic liquid.

\* \* \* \* \*